United States Patent
Rosén

(10) Patent No.: US 11,199,171 B2
(45) Date of Patent: Dec. 14, 2021

(54) FLOW CONTROLLER

(71) Applicant: E.ON Sverige AB, Malmö (SE)

(72) Inventor: Per Rosén, Lund (SE)

(73) Assignee: E.ON SVERIGE AB, Malmö (SE)

( * ) Notice: Subject to any disclaimer, the term of this patent is extended or adjusted under 35 U.S.C. 154(b) by 0 days.

(21) Appl. No.: 17/029,061

(22) Filed: Sep. 23, 2020

(65) Prior Publication Data

US 2021/0003109 A1 Jan. 7, 2021

Related U.S. Application Data

(63) Continuation of application No. 16/463,388, filed as application No. PCT/EP2017/083077 on Dec. 15, 2017, now Pat. No. 10,830,202.

(30) Foreign Application Priority Data

Dec. 19, 2016 (EP) .................................. 16205021

(51) Int. Cl.
F03B 3/10 (2006.01)
F03B 15/00 (2006.01)
G05D 7/06 (2006.01)
H02K 7/18 (2006.01)

(52) U.S. Cl.
CPC .............. *F03B 3/103* (2013.01); *F03B 15/00* (2013.01); *G05D 7/0676* (2013.01); *H02K 7/1823* (2013.01)

(58) Field of Classification Search
CPC ........ F03B 3/103; F03B 13/086; F03B 15/00; F03B 13/00; G05D 7/0676; F04D 15/0254

See application file for complete search history.

(56) References Cited

U.S. PATENT DOCUMENTS

| 8,193,652 | B2* | 6/2012 | Paoli | F03B 3/103 290/43 |
| 10,408,186 | B2* | 9/2019 | Olatunde | F04D 13/02 |
| 2010/0140935 | A1* | 6/2010 | Paoli | F04D 13/06 290/43 |

FOREIGN PATENT DOCUMENTS

| CN | 105041556 A | 11/2015 |
| WO | 2008/022766 A1 | 2/2008 |
| WO | 2008/056083 A2 | 5/2008 |
| WO | 2016/049086 A1 | 3/2016 |

OTHER PUBLICATIONS

International Search Report and Written Opinion dated Mar. 26, 2018 for PCT/EP2017/083077 filed on Dec. 15, 2017, 10 pages.

* cited by examiner

*Primary Examiner* — Eldon T Brockman
(74) *Attorney, Agent, or Firm* — Xsensus LLP

(57) ABSTRACT

The present invention relates to a flow controller configured to selectively act as a pump or as a flow regulator. The flow controller comprises: an inlet for a fluid; an outlet for the fluid; a pump assembly arranged between the inlet and the outlet and configured to pump the fluid through the flow controller from the inlet to the outlet; a hydro electrical generator assembly arranged between the inlet and the outlet, the hydro electrical generator assembly configured to allow the fluid flow through the flow controller from the inlet to the outlet and to generate electricity by transforming flow energy of the fluid flowing through the flow controller into electricity; and a mode controller configured to selectively set the flow controller in a pumping mode or in an electricity generating mode.

10 Claims, 4 Drawing Sheets

FLOW CONTROLLER

CROSS-REFERENCE TO RELATED APPLICATIONS

The present application is a continuation of U.S. application Ser. No. 16/463,388, filed May 23, 2019, which is based on PCT filing PCT/EP2017/083077, filed Dec. 15, 2017, which claims priority to EP 16205021.5, filed Dec. 19, 2016, the entire contents of each are incorporated herein by reference.

FIELD OF THE INVENTION

The invention relates to a flow controller for controlling flow of a fluid between a first and a second reservoir of fluids.

BACKGROUND OF THE INVENTION

There exist many applications where a fluid is to be transferred from a first reservoir of fluid to a second reservoir of fluid. This transfer may be troublesome, especially in case of changes in differential pressure between the first and second reservoirs.

SUMMARY OF THE INVENTION

It is an object of the present invention to solve at least some of the problems mentioned above.

The invention is defined by the independent claims. Preferred embodiments are listed in the dependent claims.

Further, according to an alternative aspect, a flow controller configured to selectively act as a pump or a flow regulator for a transport of fluid from a first reservoir to a second reservoir is provided. The flow controller comprising: an inlet connectable to the first reservoir; an outlet connectable to the second reservoir; a pump assembly arranged between the inlet and the outlet and configured to pump fluid through the flow controller from the inlet to the outlet thereby transporting fluid from the first reservoir to the second reservoir; a flow regulator assembly arranged between the inlet and the outlet, the flow regulator assembly being configured to allow fluid to flow through the flow controller from the inlet to the outlet, thereby transporting fluid from the first reservoir to the second reservoir, and to generate electricity by transforming flow energy of fluid flowing through the flow controller into electricity; and a mode controller configured to selectively set the flow controller in a pumping mode or in an electricity generating mode; wherein upon being set in the pumping mode, the mode controller is configured to deactivate the flow regulator assembly and to activate the pump assembly; wherein upon being set in the electricity generating mode, the mode controller is configured to deactivate the pump assembly and to activate the flow regulator assembly; wherein the mode controller is configured to set the flow controller in the pumping mode or the electricity generating mode based on a signal indicative on a pressure difference between the fluid at the inlet and the fluid at the outlet; wherein the flow controller further comprises a wheel, wherein the wheel is selectively operable as a pump wheel of the pump assembly to provide pump action upon the flow controller is set in the pumping mode and as a turbine wheel of the flow regulator assembly to provide hydro electrical generation upon the flow controller is set in the electricity generating mode; and wherein a direction of flow of fluid through the pump assembly and a direction of flow of fluid through the flow regulator assembly are the same.

The wording "selectively act as a pump or a flow regulator" should be construed as the flow controller is at one point in time acting as a pump and at another point in time acting as a flow regulator. Moreover, the wording "selectively set the flow controller in a pumping mode or in an electricity generating mode" should be construed as the flow controller is at one point in time set in the pumping mode and at another point in time set in the electricity generating mode.

The wording "pump" should be construed as a device configured to, in a controlled way, allow fluid to be pumped through the pump when the pump is in an active pumping state. In the expression "in a controlled way" it is comprised that the pump may regulate the flow rate of the fluid being pumped by the pump.

The wording "pump assembly" should be construed as an assembly of units that together are configured to, in a controlled way, allow fluid to be pumped through the flow regulator when the pump assembly is in an active state. Upon the pump assembly being in the pumping mode, the flow through the flow controller may be regulated by driving the wheel (or impeller) at different frequencies. Different predetermined frequencies correspond to different flows through the flow controller.

The wording "flow regulator assembly" should be construed as an assembly of units that together are configured to, in a controlled way, allow fluid to flow through the flow regulator assembly when the flow regulator assembly is in an active state. Moreover, the flow regulator assembly may also be arranged such that the flow rate of fluid through the flow regulator assembly may be controlled. Hence, the flow regulator assembly may be arranged to regulate the flow of fluid theretrough.

The wording "fluid" should be construed as any liquid substance. According to non-limiting embodiments the fluid comprises water. However, according to other embodiments other fluids may be used. Some non-limiting examples are ammonia, oils, alcohols and anti-freezing liquids such as glycol. The fluid may also comprise a mixture of two or more of the fluids mentioned above.

For some applications the flow regulator assembly may be seen as a hydro electrical generator assembly. The wording "hydro electrical generator assembly" should be construed as an assembly of units that together are configured to, in a controlled way, allow fluid to flow through the flow regulator assembly when the flow regulator assembly is in an active state. Moreover, upon the flow regulator assembly is seen as the hydro electrical generator assembly it is configured to generate electricity by transforming flow energy of the fluid flowing through the flow controller into electricity when the flow regulator assembly is in the electricity generating mode.

For some applications a differential pressure between two reservoirs of fluid changes over time. More precisely, the differential pressure between two reservoirs of fluid may change such that the differential pressure changes from positive to negative or vice versa. Hence, for such applications, upon fluid is to be transferred from a first one of the reservoirs of fluid to a second one of the reservoirs of fluid, sometimes fluid need to be pumped from the first one of the reservoirs of fluid to the second one of the reservoirs of fluid and sometimes fluid need to be allowed to flow from the first one of the reservoirs of fluid to the second one of the reservoirs of fluid. The present flow controller allows for an efficient flow control of fluid between the first and second reservoirs. Moreover, the present flow controller may be made physically compact. Hence, physical space may be saved. Furthermore, the present flow controller allows for transfer of the fluid between the first and second reservoirs in an energy efficient manner.

The flow controller may be embodied as a centrifugal pump or as an impeller pump. For such pumps the flow of fluid going through the pump assembly may be controlled by controlling the frequency of the rotation of the wheel (or impeller) in the respective pump.

Using the wheel as both the pump wheel and the turbine wheel allow for construction of a physically compact flow controller.

The flow regulator assembly may additionally be set in a flow decreasing mode. Upon the flow regulator assembly being set in the flow decreasing mode, the flow through the flow controller may be regulated by driving the wheel (or impeller) so that the wheel (or impeller) is rotating against the flow direction. The wheel may be rotated at a predetermined frequency. By rotating the wheel against the flow direction the flow of fluid through the flow controller may be slowed down. Different predetermined frequencies correspond to different flows through the flow controller. Hence, the flow through flow controller may be deaccelerated by rotating the wheel against the direction of flow through the flow controller.

The mode controller may be configured to set the flow controller in the pumping mode in case the signal is indicative of that the pressure of the fluid at the inlet is equal or lower than the pressure at the outlet. This protects the flow controller from being damaged.

The mode controller may be configured to set the flow controller in the electricity generating mode or in the flow decreasing mode in case the signal is indicative of that the pressure of the fluid at the inlet is higher than the pressure at the outlet. This further protects the flow controller from being damaged. The choice of setting the flow controller in the electricity generating mode or in the flow decreasing mode is based on a pressure difference between a pressure of the fluid at the inlet and a pressure of the fluid at the outlet. For relatively low pressure differences the mode controller is configured to set the flow controller in the electricity generating mode and for relatively high pressure differences the mode controller is configured to set the flow controller in the flow decreasing mode. The value at which the flow decreasing mode is to chosen instead of the electricity generating mode depend on the actual flow rate through the flow controller. In case of the flow rate need to be decreased due to the relatively high pressure difference the mode controller is configured to set the flow controller in the flow decreasing mode.

The flow controller may further comprise a battery configured to store electricity generated by the hydro electrical generator assembly. Hence, the electricity generated by the hydro electrical generator assembly may be stored for later use.

The pump assembly may further comprise an electric motor. The electric motor may be configured to at least partly be powered by the electricity stored in the battery. This allows for an energy efficient flow controller since electricity generated by the hydro electrical generator assembly may later be used for pumping of fluid in cases when fluid need to be pumped from the first reservoir to the second reservoir. Further, this allows for an energy efficient flow controller since electricity generated by the hydro electrical generator assembly may later be used for deaccelerating a flow of fluid through the flow controller upon the flow controller being set in the flow decreasing mode.

The flow controller may further comprise a first flow channel for the fluid and a second flow channel for the fluid, wherein the first flow channel forming part of the pump assembly and the second flow channel forming part of the hydro electrical generator assembly. This allow for a simple construction of the flow controller.

The flow controller may further comprise a flow director configured to be controlled by the mode controller. The flow director may be configured to direct flow of the fluid through the first flow channel and block flow of the fluid through the second channel upon the flow controller is set in the pumping mode. The flow director may be configured to direct flow of the fluid through the second flow channel and block flow of the fluid through the first channel upon the flow controller is set in the electricity generating mode. This allow for a simple construction of the flow controller.

The electric motor and the generator may be the same unit configured to act as the electric motor, upon the flow controller being set in the pumping mode, and to act as the generator, upon the flow controller being set in the electricity generating mode.

According to yet an alternative aspect a flow controller is provided. The flow comptroller is configured to selectively act as a pump or as a flow regulator for a transport of fluid from a first reservoir to a second reservoir. The flow controller comprising: an inlet connectable to the first reservoir; an outlet connectable to the second reservoir; a pump assembly arranged between the inlet and the outlet and configured to pump fluid through the flow controller from the inlet to the outlet, thereby transporting fluid from the first reservoir to the second reservoir; a flow regulator assembly arranged between the inlet and the outlet, the flow regulator assembly being configured to allow fluid to flow through the flow controller from the inlet to the outlet, thereby transporting fluid from the first reservoir to the second reservoir, the flow regulator assembly being configured to be selectively set in an electricity generating mode and in a flow decreasing mode, wherein upon being set in the electricity generating mode the flow regulator assembly is configured to generate electricity by transforming flow energy of fluid flowing through the flow controller into electricity, and wherein upon being set in the flow decreasing mode the flow regulator assembly is configured to deaccelerate the flow of fluid flowing through the flow controller; and a mode controller configured to selectively set the flow controller in a pumping mode, in the electricity generating mode, or in the flow decreasing mode, wherein the mode controller is configured to set the flow controller in the pumping mode, the electricity generating mode, or the flow decreasing mode based on a signal indicative on a pressure difference between the fluid at the inlet and the fluid at the outlet; and wherein a direction of flow of fluid through the pump assembly and a direction of flow of fluid through the flow regulator assembly are the same.

Upon the flow regulator assembly being set in the flow decreasing mode, the flow through the flow controller may be regulated by driving a wheel (or impeller) so that the wheel (or impeller) is rotating against the flow direction. The wheel may be rotated at a predetermined frequency. By rotating the wheel against the flow direction the flow of fluid through the flow controller may be slowed down. Different predetermined frequencies correspond to different flows through the flow controller. Hence, the flow through flow controller may be deaccelerated by rotating the wheel against the direction of flow through the flow controller.

The mode controller may be configured to set the flow controller in the pumping mode in case the signal is indicative of that the pressure of the fluid at the inlet is equal or lower than the pressure at the outlet.

The mode controller may be configured to set the flow controller in the electricity generating mode or in the flow decreasing mode in case the signal is indicative of that the pressure of the fluid at the inlet is higher than the pressure at the outlet. The choice of setting the flow controller in the electricity generating mode or in the flow decreasing mode is based on a pressure difference between a pressure of the fluid at the inlet and a pressure of the fluid at the outlet. For relatively low pressure differences the mode controller is configured to set the flow controller in the electricity generating mode and for relatively high pressure differences the mode controller is configured to set the flow controller in the flow decreasing mode. The value at which the flow decreasing mode is to be chosen instead of the electricity generating mode depend on the actual flow rate through the flow controller. In case of the flow rate need to be decreased due to the relatively high pressure difference the mode controller is configured to set the flow controller in the flow decreasing mode. Hence, the flow controller may further comprise a flow meter configured to measure a fluid flow through the flow controller. Upon the measured fluid flow through the flow controller is above a predetermined threshold the mode controller is configured to set the flow controller in the flow decreasing mode.

The flow controller according to the yet alternative aspect may further comprises a wheel. The wheel may be selectively operable as a pump wheel of the pump assembly to provide pump action upon the flow controller is set in the pumping mode, as a turbine wheel of the flow regulator assembly to provide hydro electrical generation upon the flow controller is set in the electricity generating mode, or as a flow regulating wheel of the flow regulator assembly to provide a deaccelerating force to the fluid flowing through the flow controller upon the flow controller is set in the flow decreasing mode.

Upon the flow controller being set in the electricity generating mode or the flow decreasing mode, the mode controller may be configured to deactivate the pump assembly and to activate the flow regulator assembly.

Upon the flow controller being set in the pumping mode, the mode controller is configured to deactivate the flow regulator assembly and to activate the pump assembly.

The above mentioned features of the flow controller according to the present invention and the alternative aspect, when applicable, apply to this yet alternative aspect as well. In order to avoid undue repetition, reference is made to the above.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description.

Hence, it is to be understood that this invention is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

These and other aspects of the present invention will now be described in more detail, with reference to the appended drawings showing embodiments of the invention. The figures are provided to illustrate the general structures of embodiments of the present invention. Like reference numerals refer to like elements throughout.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and to fully convey the scope of the invention to the skilled person.

Figure 1:
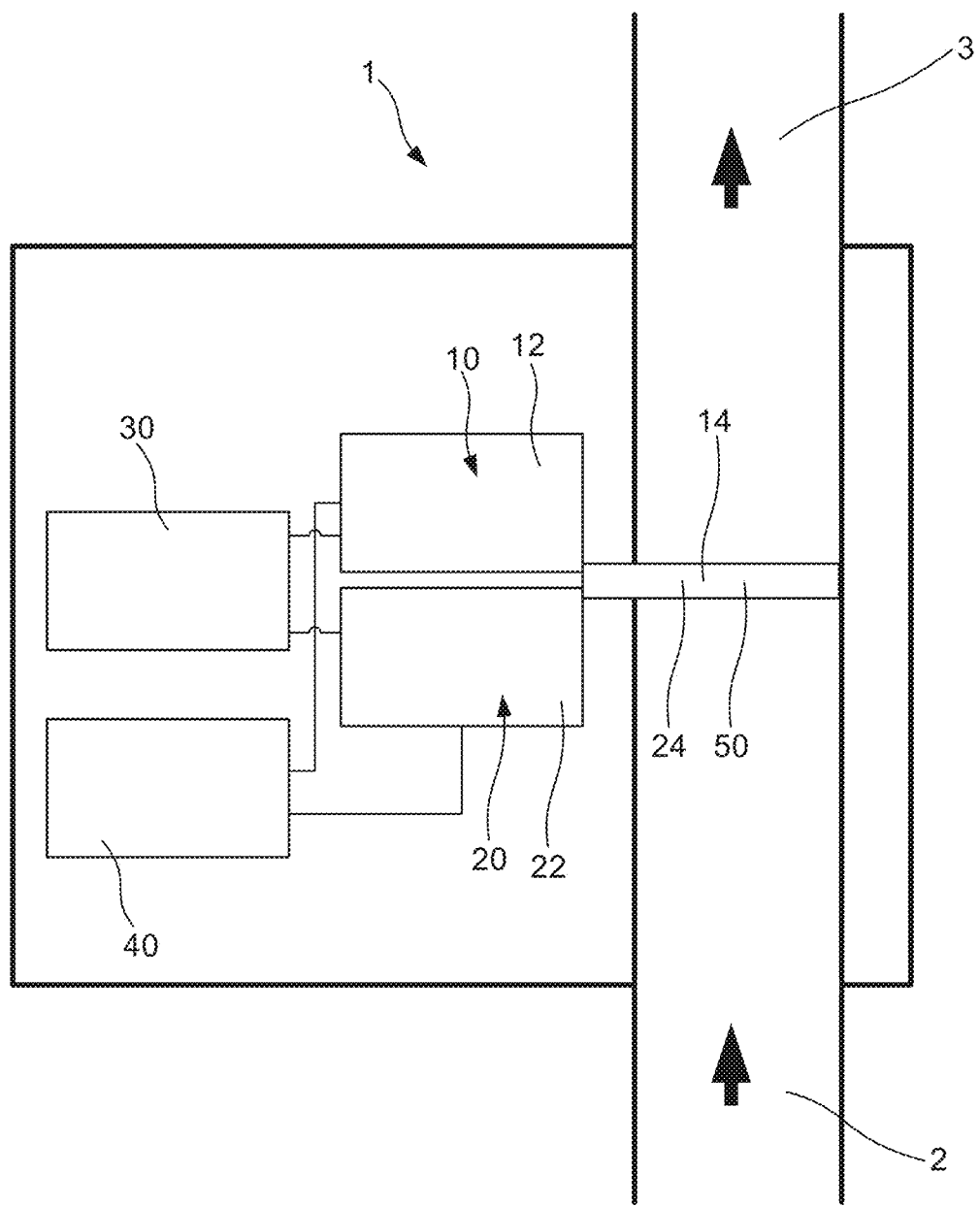
FIG. 1 is a schematic illustration of a flow controller.
Figure 2A:
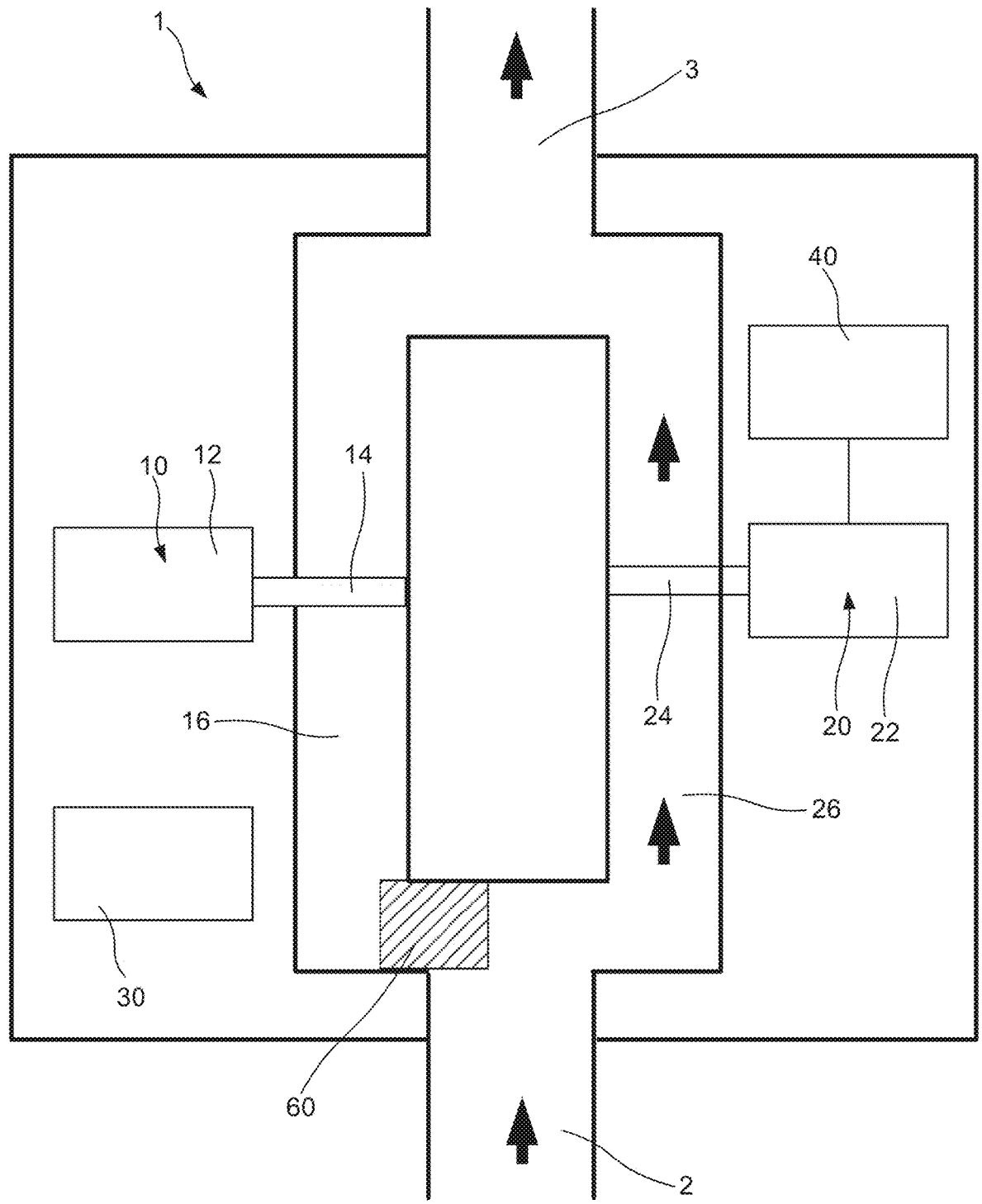
FIG. 2A is a schematic illustration of an alternative flow controller set in an electricity generating mode.
Figure 2B:
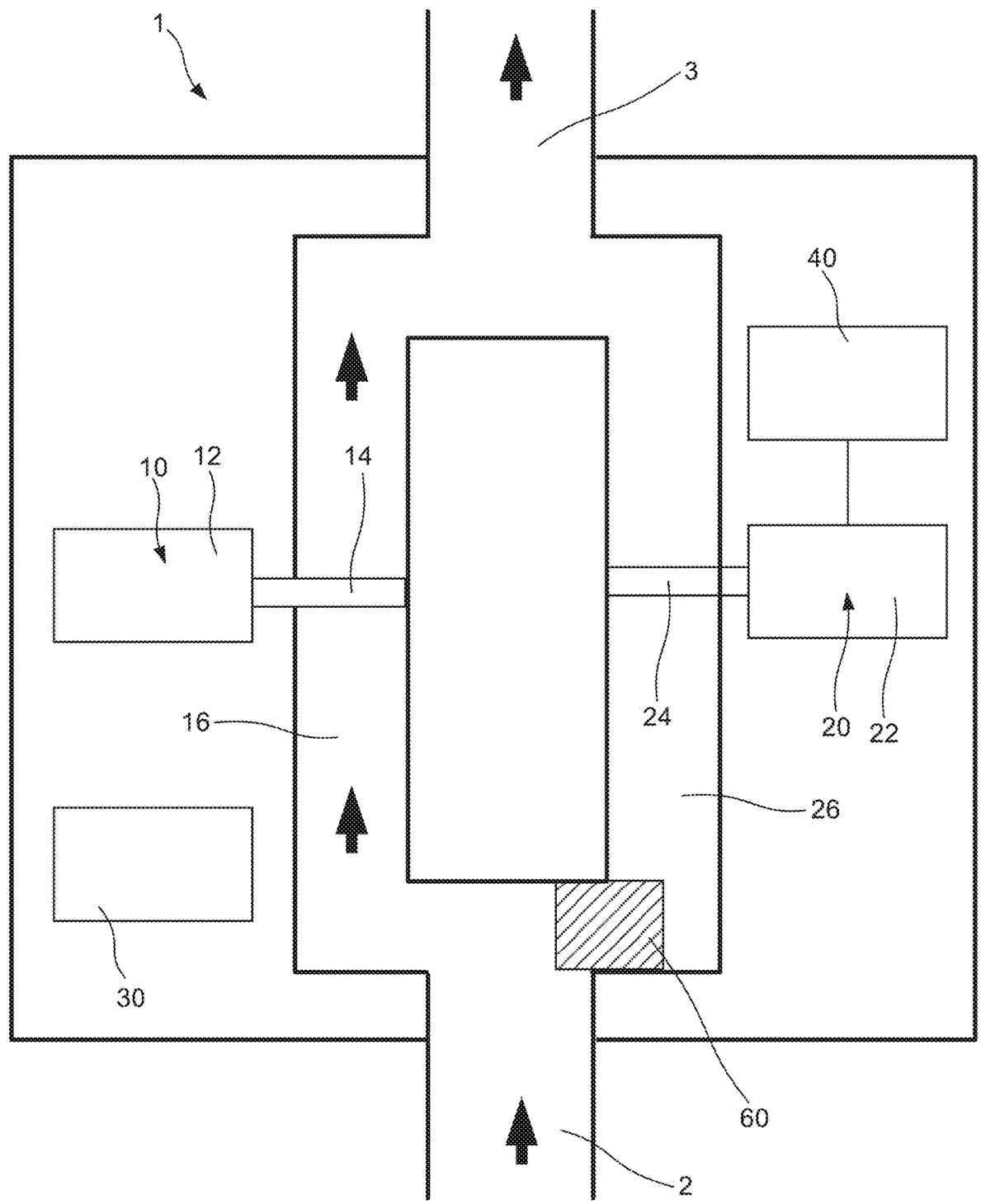
FIG. 2B is a schematic illustration of the alternative flow controller of FIG. 2A set in a pumping mode.

In FIG. 1 a flow controller 1 is schematically illustrated. In FIGS. 2A and 2B an alternative flow controller 1 is schematically illustrated.

Below first common features of both the flow controller 1 as illustrated in FIG. 1 and the alternative flow controller 1 as illustrated in FIGS. 2A and 2B will be discussed. Thereafter specific features of the two alternative flow controller 1 will be discussed.

The flow controller comprises an inlet 2 for a fluid, an outlet 3 for the fluid, a pump assembly 10 arranged between the inlet 2 and the outlet 3, a flow regulator assembly 20 arranged between the inlet 2 and the outlet 3, and a mode controller 30.

The flow controller 1 is configured to be connected in between a first and a second reservoir (not shown) of fluid. The inlet 2 is configured to be connected to the first reservoir. The outlet 3 is configured to be connected to the second reservoir.

The pump assembly 10, upon being active, is configured to pump the fluid through the flow controller 1 from the inlet 2 to the outlet 3. Hence, the pump assembly 10, upon being active, is configured to pump fluid from the first reservoir to the second reservoir. The pump assembly 10 may comprise a pumping wheel 14 and an electric motor 12. The electric motor 12 is configured to, upon the pump assembly 10 being active, turn the pumping wheel 14 and thereby inducing pumping action to the pump assembly 10. Hence, the pump wheel 14 of the pump assembly 10 is configured to provide pump action. Moreover, the pump assembly 10 may also be arranged such that the flow rate of fluid through the flow controller 1 may be controlled.

The flow regulator assembly 20, upon being active, is configured to allow the fluid to flow through the flow controller 1 from the inlet 2 to the outlet 3. Moreover, upon being active, the flow regulator assembly 20 is further configured to be selectively set in an electricity generating mode or in a flow decreasing mode.

Upon being set in the electricity generating mode the flow regulator assembly 20 is configured to generate electricity by transforming flow energy of the fluid flowing through the flow controller 1 into electricity. The flow regulator assembly 20 may comprise a turbine wheel 24 to provide hydro electrical generation and a generator 22 configured to be connected to the turbine wheel 24. The generator 22 is configured to generate electricity upon the turbine wheel 24 being turned. The turbine wheel 24 being turned by a flow of fluid flowing through the flow controller 1 upon the flow regulator assembly 20 being set in the electricity generating mode. Hence, the turbine wheel 24 of the hydro electrical generator assembly 20 is configured to provide hydro electrical generation.

As mentioned above, the flow regulator assembly 20 may additionally be set in a flow decreasing mode. Upon the flow regulator assembly 20 being set in the flow decreasing mode, the flow through the flow controller 1 may be regulated by driving the turbine wheel 24, now acting as a deaccelerating means, so that the wheel 24 is rotating against the fluid flow direction. The wheel 24 may be rotated at a predetermined frequency. By rotating the wheel 24 against the fluid flow direction the flow of fluid through the flow controller may be slowed down. Different predetermined frequencies correspond to different flows through the flow controller 1. Hence, the flow through flow controller 1 may be deaccelerated by rotating the wheel 24 against the direction of flow through the flow controller 1.

The mode controller 30 is configured to selectively set the flow controller 1 in a pumping mode, in the electricity generating mode, or in the flow decreasing mode. In the pumping mode the flow regulator 1 is acting as a pump. In the electricity generating mode the flow regulator 1 is acting as a flow regulator and at the same time as a generator for electricity. In the flow decreasing mode the flow regulator 1 is acting as a flow regulator and at the same time slowing down the flow of fluid through the flow controller 1. Hence, the flow controller 1 is configured to selectively act as a pump or as a flow regulator. The flow controller 1 is configured to, upon acting as a pump, pump the fluid from the first reservoir to the second reservoir. The flow controller 1 is configured to, upon acting as a flow regulator, allow the fluid to flow from the first reservoir to the second reservoir. Upon being set in the pumping mode, the mode controller 30 is configured to deactivate the flow regulator assembly 20 and to activate the pump assembly 10. Upon being set in the electricity generating mode or in the flow decreasing mode, the mode controller 30 is configured to deactivate the pump assembly 10 and to activate the flow regulator assembly 20.

For some applications a differential pressure between the first and second reservoirs of fluid changes over time. More precisely, the differential pressure between the first and second reservoirs of fluid may change such that the differential pressure changes from positive to negative or vice versa. For such applications, upon fluid is to be transferred from the first reservoir to the second reservoir, sometimes fluid need to be pumped from the first reservoir to the second reservoir and sometimes fluid need to be allowed to flow from the first reservoir to the second reservoir. More precisely, in case the pressure of the fluid is higher in the first reservoir than in the second reservoir the flow controller 1 is configured to allow a flow of the fluid to flow through the flow controller 1. Hence, the mode controller 30 is configured to set the flow controller 1 in the electricity generating mode or in the flow decreasing mode. Further, in case the pressure of the fluid is lower in the first reservoir than in the second reservoir the flow controller 1 is configured to pump a flow of the fluid from the first reservoir to the second reservoir. Hence, the mode controller 30 is configured to set the flow controller 1 in the pumping mode.

The mode controller 30 may be configured to receive a signal indicative on a pressure difference between fluid of the first and second reservoirs. Hence, the signal is indicative on a pressure difference between fluid at the inlet 2 and fluid at the outlet 3. The signal indicative on the pressure difference between fluid at the inlet 2 and fluid at the outlet 3 may be derived from pressure gauges arranged at the inlet 2 and at the outlet 3. The flow controller 1 may hence comprise a first pressure gauge arranged at the inlet 2 and a second pressure gauge arranged at the outlet 3. The first and second pressure gauges being configured to determine a respective pressure of the fluid at the inlet 2 and the outlet 3, respectively. The pressures determined by the first and second pressure gauges may be used to derive the signal indicative on the pressure difference between fluid at the inlet 2 and fluid at the outlet 3. The signal indicative on the pressure difference between fluid at the inlet 2 and fluid at the outlet 3 may be derived by the mode controller 30.

The mode controller 30 may be fully hardware implemented. Alternatively, the mode controller 30 may be fully software implemented. Yet alternatively, the mode controller 30 may be a combined hardware and software implementation. The software portions of the mode controller 30 may be run on a processing unit.

The mode controller 30 may be configured to set the flow controller 1 in the pumping mode, the electricity generating mode, or the flow decreasing mode based on a signal indicative on the pressure difference between the fluid at the inlet 2 and the fluid at the outlet 3. If so, the mode controller 30 is configured to set the flow controller 1 in the pumping mode in case the signal is indicative of that the pressure of the fluid at the inlet 2 is equal or lower than the pressure at the outlet 3. Moreover, if so, the mode controller 30 is configured to set the flow controller 1 in the electricity generating mode or in the flow decreasing mode in case the signal is indicative of that the pressure of the fluid at the inlet 2 is higher than the pressure at the outlet 3. The choice of setting the flow controller in the electricity generating mode or in the flow decreasing mode is based on a pressure difference between a pressure of the fluid at the inlet 2 and a pressure of the fluid at the outlet 3. For relatively low pressure differences the mode controller 30 is configured to set the flow controller 1 in the electricity generating mode and for relatively low pressure differences the mode controller 30 is configured to set the flow controller in the flow decreasing mode. The value at which the flow decreasing mode is to chosen instead of the electricity generating mode depend on the actual flow rate through the flow controller 1. In case of the flow rate need to be decreased due to the relatively high pressure difference the mode controller 30 is configured to set the flow controller 1 in the flow decreasing mode.

The mode controller 30 may also be configured to control the flow rate of fluid through the flow regulator 1. Accordingly, the mode controller 30 may also be configured to control the pump assembly 10 such that the flow rate of fluid pumped by the pump assembly 10 is controlled. This may be done by regulating a rotation frequency of a pump wheel 14 of the pump assembly 10. Moreover, the mode controller 30 may also be configured to control the flow regulator assembly 20 such that the flow rate of fluid flowing through the hydro electrical generator assembly 20 is controlled. This may be done, as have been discussed above, by regulating the rotation frequency of the wheel 24.

With reference to FIG. 1 the flow controller 1 may further comprise a wheel 50. The wheel 50 is selectively operable as the pump wheel 14 of the pump assembly 10 and as a turbine wheel 24 of the flow regulator assembly 20. Upon the flow controller 1 is set in the pumping mode the wheel 50 is selectively operable as the pump wheel 14. Upon the flow controller 1 is set in the electricity generating mode the wheel 50 is selectively operable as the turbine wheel 24. Upon the flow controller 1 is set in the flow decreasing mode the wheel 50 is selectively operable as a deaccelerating means. Hence, in the pumping mode the wheel 50 is acting as the pumping wheel 24 and is configured to be connected to the electric motor 12. Moreover, in the electricity generating mode the wheel 50 is acting as the turbine wheel 24 and is configured to be connected to the generator 22. Furthermore, in the flow decreasing mode the wheel 50 is acting as a deaccelerating means and is configured to be connected to the electric motor 12.

With reference to FIGS. 2A and 2B the flow controller 1 may comprise a first flow channel 16 for the fluid and a second flow channel 26 for the fluid. The first flow channel 16 forming part of the pump assembly 10. The second flow channel 26 forming part of the flow regulator assembly 20. The flow controller 1 may further comprise a flow director 60. The flow director 60 is configured to be controlled by the mode controller 30. Upon the flow controller 1 is set in the pumping mode, the flow director 60 is configured to direct flow of the fluid through the first flow channel 16 and block flow of the fluid through the second channel 26. This is illustrated in FIG. 2B. Upon the flow controller 1 is set in the electricity generating mode or in the flow decreasing mode, the flow director 60 is configured to direct flow of the fluid through the second flow channel 26 and block flow of the fluid through the first channel 16. This is illustrated in FIG. 2A. The flow director 60 may be embodied in many different ways. According to a non-limiting example, the flow director 60 may comprise a sliding block configured to selectively block flow of the fluid through the first and second flow channels 16, 26, respectively. Upon the sliding block of the flow director 60 is blocking one of the first and second flow channels 16, 26 the other one is opened allowing fluid to flow there through.

The person skilled in the art realizes that the present invention by no means is limited to the preferred embodiments described above. On the contrary, many modifications and variations are possible within the scope of the appended claims.

For example, the flow controller 1 may further comprise a battery 40. The battery may be configured to store electricity generated by the hydro electrical generator assembly 20. The electric motor 12 may be configured to at least partly be powered by the electricity stored in the battery 40. The mode controller 30 may at least party be configured to be powered by the electricity stored in the battery 40.

Figure 3:
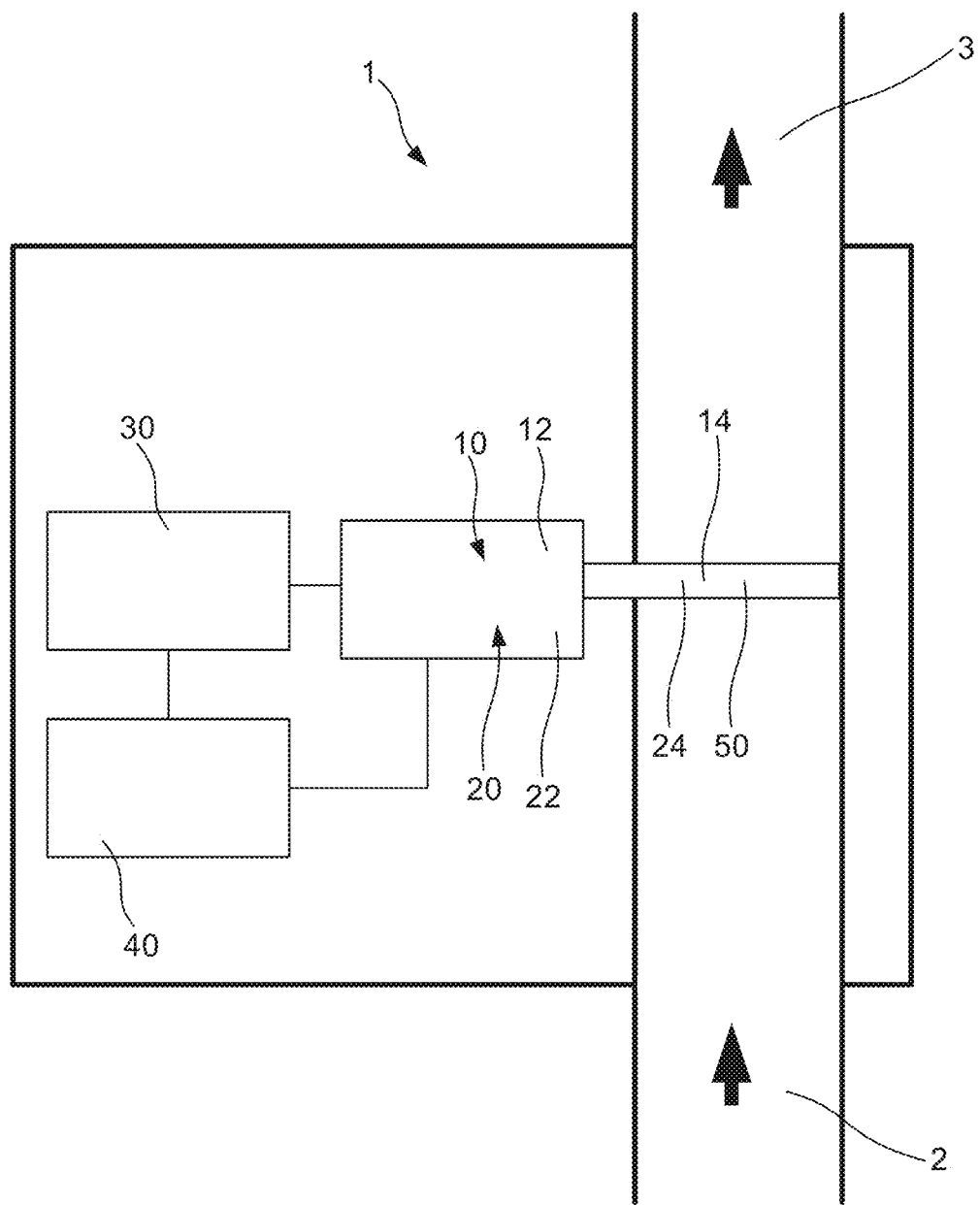
FIG. 3 is an alternative configuration of the flow controller in FIG. 1.

Moreover, the electric motor 12 may be configured to act as the generator 22 upon the flow controller 1 is set in the electricity generating mode. This is schematically illustrated in FIG. 3. Upon being set in the pumping mode or in the flow decreasing mode, the electric motor 12 is configured to be supplied by electricity. The mode controller 30 may be configured to control the supply of electricity to the electric motor 12. When being applied by electricity the electric motor 12 is configured to turn the wheel 50 now acting as the pumping wheel 14 or the deaccelerating means. Upon being set in the electricity generating mode the electric motor 12 is configured to act as the generator 22. When the electric motor 12 is acting as the generator 22 turning of the wheel 50 now acting as the turbine wheel 14 induce the generator 22 to generate electricity. In accordance with the above, the generated electricity may be stored in the battery 40. The electricity stored in the battery 40 may then later be used for powering the electric motor 12 when being set in the pumping mode or in the flow decreasing mode.

Additionally, variations to the disclosed embodiments can be understood and effected by the skilled person in practicing the claimed invention, from a study of the drawings, the disclosure, and the appended claims.

The invention claimed is:

1. A flow controller configured to selectively act as a pump or as a flow regulator for a transport of fluid from a first reservoir to a second reservoir, the flow controller comprising:
   an inlet connectable to the first reservoir;
   an outlet connectable to the second reservoir;
   a pump assembly arranged between the inlet and the outlet, the pump assembly comprising a first wheel configured to pump fluid through the flow controller in a flow direction from the inlet to the outlet, thereby pumping fluid from the first reservoir to the second reservoir;
   a flow regulator assembly arranged between the inlet and the outlet, the flow regulator assembly comprising a second wheel configured to rotate against the flow direction from the inlet to the outlet, thereby regulating a fluid flow from the first reservoir to the second reservoir; and
   a mode controller configured to selectively set the flow controller in a pumping mode or in a flow regulating mode based on a signal indicative on a pressure difference between the fluid at the inlet and the fluid at the outlet;
   wherein upon being set in the pumping mode, the mode controller is configured to activate the pump assembly; and
   wherein upon being set in the flow regulating mode, the mode controller is configured to activate the flow regulator assembly.

2. The flow controller according to claim 1, wherein upon being set in the pumping mode, the mode controller is configured to deactivate the flow regulator assembly.

3. The flow controller according to claim 1, wherein upon being set in the flow regulating mode, the mode controller is configured to deactivate the pump assembly.

4. The flow controller according to claim 1, wherein the mode controller is configured to control a frequency of rotation of the first wheel of the pump assembly and/or the second wheel of the flow regulator assembly.

5. The flow controller according to claim 1, further comprising an electric motor configured to rotate the first wheel and/or the second wheel.

6. The flow controller according to claim 1, wherein the first wheel of the pump assembly and the second wheel of the flow regulator assembly is a common wheel, wherein upon the flow controller being set in the pump mode the common wheel is configured to pump fluid through the flow controller in the flow direction from the inlet to the outlet, thereby pumping fluid from the first reservoir to the second reservoir, and wherein upon the flow controller being set in the flow regulating mode the common wheel is configured to rotate against the flow direction from the inlet to the outlet, thereby regulating a fluid flow from the first reservoir to the second reservoir.

7. The flow controller according to claim 1, wherein the mode controller is configured to set the flow controller in the pumping mode in case the signal is indicative of that the pressure of the fluid at the inlet is equal or lower than the pressure at the outlet.

8. The flow controller according to claim 1, wherein the mode controller is configured to set the flow controller in the flow regulating mode in case the signal is indicative of that the pressure of the fluid at the inlet is higher than the pressure at the outlet.

9. The flow controller according to claim 1, embodied as a centrifugal pump.

10. The flow controller according to claim 1, embodied as an impeller pump.

* * * * *